3,177,158
REMOVAL OF ARSENIC CONTAMINANT FROM PLATINUM-ALUMINA CATALYTIC COMPOSITES
William K. T. Gleim, Island Lake, Ill., assignor to Universal Oil Products Company, Des Plaines, Ill., a corporation of Delaware
No Drawing. Filed Sept. 6, 1961, Ser. No. 136,172
9 Claims. (Cl. 252—414)

The present application is a continuation-in-part of my copending application, Serial No. 717,802, filed February 27, 1958, and now abandoned. The present invention relates to the purification of catalytic composites containing platinum-group metals, and is specifically directed to a particular method for effecting the substantially complete removal of arsenic from platinum-containing catalytic composites which have been contaminated therewith.

Catalytic composites, containing at least one metal of the platinum-group, have attained extensive commercial utility in industries such as the pharmaceutical, detergent, insecticidal, petroleum, etc. These commercial industries utilize metal-containing catalytic composites, particularly those comprising platinum and/or palladium for the purpose of promoting a multitude of reactions including hydrogenation, dehydrocyclization, hydrocracking, polymerization, isomerization, etc. Regardless of the industry and/or reaction involved, it is essential for commercial acceptance, that the particular catalytic composite exhibit a prolonged capability for the performance of its intended function, as well as a high degree of activity. Relatively recent developments have indicated that platinum-containing catalytic composites possess an unusually high degree of activity in promoting the various reactions hereinabove set forth. However, after extended periods of use, these platinum-containing catalysts usually become deactivated, thereby losing their capability to function as desired.

The deactivation of a platinum-containing catalytic composite is seldom sudden, and most often occurs through a gradual decline in activity until such time as the catalyst is no longer active to the necessary and desired degree. Deactivation may result from any one of a combination of a number of adverse effects. These effects may, in turn, result from substances which are peculiar to a particular catalyst and which either result in a change in the physical state of the components of the catalyst, or result in a loss of said components. Catalyst deactivation may also result from the deposition of impurities: these impurities are usually in the form of a solid which covers the catalytically active surfaces, thereby shielding them from the materials being processed.

Generally, the deposition of coke and other carbonaceous material is a direct cause of catalyst deactivation, or may exist in conjunction with any of the aforementioned causes of catalyst deactivation. A widely utilized method effective for at least a partial regeneration of the catalyst, is burning the coke-containing catalyst in a free oxygen-containing gas, usually air, at elevated temperatures. It is well known that this method removes effectively the carbonaceous material, and, to all appearances, produces an active catalyst. However, due to the deposition and/or incorporation of other impurities, which impurities are not removed through the simple expediency of high-temperature oxidation, the degree of activity of the regenerated catalyst is less than that activity required for utilization as intended.

Arsenic is somewhat similar to coke as a catalyst deactivating influence, but only to the extent of effecting the rapid decline of the activity and stability of the catalyst. The same degree of catalyst deactivation, resulting from a given concentration of coke and other carbonaceous material, will often result from a much lower concentration of arsenic with respect to the same type of catalytic composite. Generally, the deposition of arsenic is effected over an extended period of time, since arsenic is present in the material being processed in extremely minute quantities. Due to the inherent tenaciousness of arsenic, especially with respect to the platinum-group metals, and particularly platinum and/or palladium, virtually all of the arsenic contained by the process streams remains within the catalytic composite. Although the precise state of the arsenic, existing within the composite, is not known, it is believed to exist therein in a complex, combined form with the other components of the catalyst. It is further believed that the arsenic directly affects the physical state of the catalytically active metallic component, since arsenic is not removed therefrom through the utilization of the same type of simple expedient as will remove virtually all the coke and carbonaceous material. The presence of arsenic generally accounts for the fact that the mere high-temperature oxidation employed to remove the coke and carbonaceous material, results in a catalyst having a somewhat lesser degree of activity than that exhibited by the catalyst prior to use. Where the concentration of arsenic is sufficiently high, and such concentration need be less than about 1.0% by weight of the total composite, the catalyst will have lost substantially all its activity, and the removal of coke therefrom will have virtually no effect as concerns an increase in catalytic activity.

The object of the present invention is to effect substantially complete removal of arsenic from catalytic composites comprising a platinum-group metallic component, and is particularly directed to those composites containing platinum and/or palladium.

Therefore, in a broad embodiment, the present invention relates to a method for the removal of arsenic from an alumina-platinum catalytic composite which comprises contacting said arsenic-containing composite with a solution of free iodine in a chlorohydrocarbon at a temperature in excess of about 80° C., said solution existing substantially in the liquid state during said contacting.

In another broad embodiment, the present invention involves a method for the removal of arsenic from an alumina-platinum catalytic composite which comprises contacting said arsenic-containing composite at a temperature within the range of from about 80° C. to about 250° C., with a solution of a chlorohydrocarbon and free iodine in an amount in excess of about 0.1% by weight of said solution, said solution contacting said composite under a pressure sufficient to maintain the solution in the liquid phase.

A more limited embodiment of the present invention affords a method for the removal of arsenic from an alumina-platinum catalytic composite which comprises contacting said composite at a temperature within the range of from about 80° C. to about 250° C. and under a pressure of from about zero to about 450 pounds per square inch gauge, with a chlorohydrocarbon solution containing free iodine in an amount within the range of from about 0.1% to about 10.0% by weight of said solution, the aforesaid temperature and pressure being selected to maintain said solution in the liquid phase during said contacting.

Although the method of the present invention, upon reference to the foregoing embodiments, appears to be restricted to the removal of arsenic from those catalytic composites which have been deactivated therefrom, the method of the present invention affords, through its utilization, benefits to the manufacture of such catalytic composites, and to those processes employed for the recovery of the platinum-group metals therefrom. Platinum-group catalytic composites comprise very minor quantities of the active metallic components, generally within the range of from about 0.01% to about 10.0% by weight of the total composite, and, therefore, it is of prime importance that the metallic component employed exist in an extremely pure form, and particularly free from arsenic and compounds thereof. The method of the present invention, hereinbefore set forth in a specific embodiment, may be utilized to insure substantially complete absence of arsenic within the catalyst prior to use.

Due to some irreversible change in the physical state of the catalytic component, it often becomes necessary to discard the catalyst and resort to a fresh batch of catalyst: such a change may be a reduction in crystallite size, an increase or decrease from the preferred oxidation state thereof, etc. As a result of the high expense involved in the metallic components, the spent catalyst is not simply discarded per se. Various processes have been developed for the recovery of the metal therefrom, and the method of the present invention is effective in such recovery processes for the removal of arsenic. The removal of arsenic is required in order to recover the metal in a state such that the same is suitable for subsequent utilization in the manufacture of "fresh" catalyst.

The platinum-group metals, and the catalytic composites containing the same, which are benefited by treatment in accordance with the present invention include platinum, palladium, ruthenium, rhodium, iridum, and particularly platinum and/or palladium. These metals, effective in small quantities, are generally composited with a suitable refractory inorganic oxide. Suitable inorganic oxides include alumina, silica, zirconia, magnesia, boria, thoria, strontia, hafnia, titania, etc. Mixtures of two or more of these inorganic oxides are often employed, and include such mixtures as silica-alumina, silica-alumina-zirconia, alumina-boria, alumina-thoria, alumina-zirconia, etc. It is understood that the refractory inorganic oxides hereinabove set forth are intended to be illustrative rather than limiting unduly the method of the present invention. It is further understood that these refractory inorganic oxides may be manufactured by any suitable means including separate, successive, or coprecipititation methods, or they may be naturally-occurring substances such as clays or earths which may be purified or activated by special treatment. Similarly, the deposition of the platinum-group metal, and other components of the catalyst, may be effected in any suitable manner and the method of the present invention is neither restricted to any specific catalytic composition nor any particular means by which the same is manufactured.

As hereinbefore stated, it is believed that arsenic is the most harmful metallic impurity having a deleterious effect upon catalytic activity and stability. Other undesirable impurities having a similar, although not to as great an extent, adverse effect include antimony, cadminum, copper, lead, etc. Such impurities may be present as the element or some compound thereof, and reference to the element as such, in the specification and appended claims, is intended to include the free element and/or any complex or simple compound thereof. Referring to the metallic impurity as the element is justified, for it appears that the element is the harmful component. When present as a particular compound, such compound, as the result of the present invention, appears to be caused to decompose, forming simple compounds of the element. Such simple compounds do not exhibit the same degree of tenaciousness, and effective removal of the metallic impurity is facilitated thereby. For example, it is believed that arsenic enters into some complex state with the other components of the catalyst, one possible complex being a platinum arsenide, or other compound or complex of platinum and arsenic. It is understood that although arsenic is considered as one of the non-metals of the Periodic Table by some authorities, it resembles the metals in a number of instances.

In accordance with the present invention, the platinum-group metal composite, containing arsenic, is contacted with a free iodine-containing solution. Free iodine is designated to mean that the iodine does not exist as an element in chemical combination with the other elements. The exact form in which the free iodine is present in solution is not definitely known. It may be present as a mono-atomic molecule, di-atomic molecule or as a polyatomic molecule, that is, an association of many of the iodine atoms. The iodine may be dissolved in almost any suitable chlorohydrocarbon in which it is soluble, including chloroform, tri-chloroethylene, carbon tetrachloride, tetrachloroethane, mono- and dichlorinated naphthalenes, etc. Liquid chlorohydrocarbons are preferred in the method of the present invention, and, a feature of the present invention is that the temperature and pressure be selected within stated limits such that the chlorohydrocarbon solution of free iodine exists as a liquid phase while contacting the arsenic-containing composite. A carbon tetrachloride solution of free iodine is particularly preferred since substantially all the arsenic is removed in a single treatment. The use of carbon tetrachloride yields platinum, or other platinum-group metal, of sufficient purity, in regard to the concentration of arsenic, for almost immediate reutilization as hereinbefore set forth.

The chlorohydrocarbon solution of free iodine may be prepared in any suitable manner; for example, iodine may be sublimed and the vapors condensed into the liquid. In the specific example hereinafter set forth, the iodine was dissolved in liquid carbon tetrachloride to a concentration in excess of about 0.1% by weight, having an upper limit of about 10.0%.

The iodine-containing chlorohydrocarbon solutions are employed at temperatures in excess of about 80° C., having an upper limit of about 250° C. In the preferred embodiment, the temperature will lie within the range of from about 150° C. to about 250° C., the higher temperatures being favored due to the increased degree of arsenic removal. The term "contacting" is used in its broadest sense to include all means of commingling the catalytic composite and the chlorohydrocarbon solution of free iodine, including mixing, washing, slurrying, etc. The contacting may be conducted in a batch-wise fashion or it may be continuous; it is, however, conducted under a pressure within the range of about 15 to about 450 pounds per square inch for the purpose of maintaining the chlorohydrocarbon solution of free iodine in the liquid phase. The greater the time of contacting the solution with platinum-containing composite, the greater the amount of impurities dissolved therein; the time of contact is inversely proportional to the temperature of the treating solution, that is, with low temperatures, low contact times may be employed, and where high temperatures are employed, shorter contacting times are utilized with a greater degree of impurity removal.

The precise mechanism by which the metallic impurity, specifically arsenic, is free from the platinum-containing composite is not definitely known. As hereinbefore set forth, the arsenic may be present in the platinum-containing composite as a platinum arsenide, or as some other platinum-arsenic complex. The iodine atom or molecule appears to break up the arsenic compound, and/or the complex, and permits the arsenic to enter into solution. The form that the arsenic takes within the solution also is definitely not known. Whatever the mechanism, the iodine in solution removes metallic impurities such as arsenic from a platinum-containing composite, and the present invention is not intended to be limited to the foregoing theories.

It is recognized that the prior art teaches the utilization of various halogen-containing compounds, particularly chlorides and fluorides, as additives during the process in which a particular platinum-containing catalyst is employed. The halogen-containing compound is added to the material being processed as an ion for the alleged purpose of "reactivating" catalyst. This method will not suffice for the removal of arsenic, and other metallic contaminants, and, in fact, the concentration thereof will continue to increase until the composite is effectively completely deactivated. The addition of the halogen-containing compound, in such prior art processes, merely serves to replenish the supply of halogen ions, originally composited with the catalyst, and which has been lost due to an inherent leaching action during the process, such halogen being desired to impart a certain acid-acting property to the catalyst. It is significant that the iodine is utilized in its elemental state in the method of the present invention, not being retained by or within the catalytic composite, and, therefore, would not create an unbalance of the desired catalyst composition.

Correlatively, the other members of the halogen family, chlorine, fluorine, and bromine, do not suffice as constituents of the chlorohydrocarbon solution of the present invention. At the restricted temperatures of the method of the present invention, vapor phase chlorine and/or bromine would not react with the arsenic-containing metal complex. Furthermore, since the contacting is conducted under pressure to maintain the chlorohydrocarbons, such as carbon tetrachloride, in the liquid phase to insure against the danger of effecting the chlorination of the catalytic components, members of the halogen family, other than iodine, would be ineffective in removing the contaminating influence of arsenic.

In general, the treatment should be effected at a temperature above about 80° C., and preferably above about 150° C., having an upper limit of about 250° C. The optimum temperature is dependent upon the solution and concentration of the free iodine. In a semi-continuous type of operation, the platinum-containing composite is disposed in a confined zone with the free iodine-containing solution being passed therethrough in either upward or downward flow. In a continuous type of operation, the catalyst and iodine solution may be passed through a treating zone either in countercurrent or concurrent flow to each other, each being continuously withdrawn from the treating zone, the platinum-containing composite separated by filtration or other suitable means from the solution, the latter being recycled for further use within the process, and either with or without separation of the impurities. Preferably, it will be desired to separate the impurities from the solution prior to the recycling thereof, and this may be accomplished in any suitable manner such as by distillation, solvent extraction, etc. In some cases it may be desirable to effect the treatment in two or more successive steps.

The time of the treatment will depend upon the impurities in the catalyst; in general, the times will vary from about one hour to about twenty-four hours or more. The necessary time of treatment may be determined by analyzing the solution withdrawn from the treating zone to determine its metallic content. The treatment will be continued until the effluent solution is substantially free from impurities, thus establishing the final effect of the treatment in removing impurities from the platinum-containing composite.

After the composite has been treated with the chlorohydrocarbon solution of free iodine, it may be washed to remove other soluble impurities, and this treatment is preferably effected at a temperature below about 200° F., and usually, at normal or room temperature.

*Example*

Two, 2 gram portions of a catalytic composite containing alumina, 0.3% by weight of platinum and contaminated by 0.45% by weight of arsenic, were separately treated with carbon tetrachloride solutions of free iodine. These solutions were prepared by adding solid iodine directly to the specified solvent. The composites were each separately covered with the solution and allowed to remain in contact therewith for approximately six hours, under pressure sufficient to maintain the carbon tetrachloride in the liquid phase, after which time the solutions were decanted off, and the composite dried and analyzed for arsenic content. At a temperature of 77° C., 0.21% by weight of arsenic remained upon the composite. At a temperature of 200° C., 0.005% by weight of arsenic remained on the composite. From these data, it will be noticed that the chlorohydrocarbon solution of free iodine was extremely effective in removing a sufficient quantity of arsenic from the platinum-containing composite, such that the latter was suitable for subsequent reutilization.

I claim as my invention:

1. A method for the removal of arsenic from an alumina-platinum catalytic composite which comprises contacting said arsenic-containing composite with and dissolving the arsenic in a chlorohydrocarbon solution containing from about 0.1% to about 10% by weight of free iodine at a temperature in excess of about 80° C., said solution being maintained substantially in the liquid state during said contacting.

2. A method for the removal of arsenic from an alumina-platinum catalytic composite which comprises contacting said arsenic-containing composite, at a temperature within the range of from about 80° C. to about 250° C., with and dissolving the arsenic in a chlorohydrocarbon solution containing from about 0.1% to about 10% by weight of free iodine, said contacting being effected under a pressure sufficient to maintain said solution in the liquid phase.

3. The method of claim 2 further characterized in that said chlorohydrocarbon is carbon tetrachloride.

4. The method of claim 2 further characterized in that said chlorohydrocarbon is a mono-chlorinated naphthalene.

5. The method of claim 2 further characterized in that said chlorohydrocarbon is a di-chlorinated naphthalene.

6. A method for the removal of arsenic from an alumina-platinum catalytic composite which comprises contacting said arsenic-containing composite, at a temperature within the range of from about 80° C. to about 250° C., with and dissolving the arsenic in a solution of a chlorohydrocarbon and free iodine in an amount in excess of about 0.1% by weight of said solution, said solution contacting said composite under a pressure sufficient to maintain the solution in the liquid phase.

7. A method for the removal of arsenic from an alumina-platinum catalytic composite which comprises contacting said arsenic-containing composite at a temperature within the range of from about 80° C. to about 250° C., and under a pressure of from about zero to about 450 pounds per square inch gauge, with and dissolving the arsenic in a chlorohydrocarbon solution containing free iodine in an amount within the range of from about 0.1% to about 10.0% by weight of said solution, the aforesaid temperature and pressure being selected to maintain said solution in the liquid phase during said contacting.

8. The method of claim 7 further characterized in that said temperature lies within the range of from about 150° C. to about 250° C.

9. The method of claim 7 further characterized in that said chlorohydrocarbon is carbon tetrachloride.

References Cited by the Examiner

UNITED STATES PATENTS 2,955,089   10/60   Gleim _____ 252—413

FOREIGN PATENTS 115,333   10/1900   Germany.

OTHER REFERENCES

Mellor: "A Comprehensive Treatise on Inorganic and Theoretical Chemistry," vol. II, 1922, Longmans Green & Company, New York, pages 87 and 88.

Partington: "Textbook of Inorganic Chemistry," Macmillan & Co., London, 1950, page 857.

MAURICE A. BRINDISI, *Primary Examiner.*